INVENTOR.
BERTRAND J. MAYLAND, AND
CARL ROBERT TRIMARKE,
BY
*Allen & Allen*
ATTORNEYS.

United States Patent Office 3,554,690
Patented Jan. 12, 1971

3,554,690
APPARATUS AND METHOD FOR REMOVING CARBON DIOXIDE FROM PROCESS GASES
Bertrand J. Mayland, Jeffersontown, and Carl Robert Trimarke, Louisville, Ky., assignors to C & I/Girdler, Inc., Cincinnati, Ohio, a corporation of Ohio
Continuation-in-part of application Ser. No. 533,738, Feb. 18, 1966, which is a continuation-in-part of application Ser. No. 137,601, Sept. 12, 1961. This application Jan. 15, 1969, Ser. No. 824,327
Int. Cl. B01d 53/00
U.S. Cl. 23—2                                                     13 Claims

ABSTRACT OF THE DISCLOSURE

A process for stripping acidic gases from gaseous mixtures with a regenerable aqueous alkaline solution wherein the gaseous mixture and solution are contacted at elevated temperature and super-atmospheric pressure in an absorber, and the rich absorbent solution is regenerated by successive flash vaporization at reduced pressure in a chamber of adequate capacity to allow, after the initial flash, a residence time of the solution in the chamber sufficient to permit the slower flash desorption reaction to proceed to equilibrium. The solution is maintained in the chamber for the above mentioned residence time and heat is added thereto to compensate for the cooling resulting from the initial flashing and slower flash desorption reaction. The resulting lean solution is thereafter withdrawn, increased in pressure and returned to the absorber.

CROSS REFERENCE TO RELATED APPLICATIONS

This application is a continuation-in-part of the copending case entitled Apparatus and Method for Removing Carbon Dioxide From Process Gases, filed Feb. 18, 1966, Ser. No. 533,738 and in the name of the same inventors and now abandoned. The last mentioned application is, in turn, a continuation-in-part of an application entitled Apparatus and Method for Removing Carbon Dioxide From Process Gases, filed Sept. 12, 1961, Ser. No. 137,601, in the name of the same inventors and now abandoned.

BACKGROUND OF THE INVENTION

(1) Field of the invention

The invention relates to the removal of acidic gases inclusive of carbon dioxide and hydrogen sulfide from gaseous mixtures by means of a regenerable aqueous alkaline solution which absorbs the acidic gases, and the regeneration of the aqueous alkaline absorption solution.

(2) Description of the prior art

For the most part, prior art workers have removed acidic gases fom gaseous mixtures by scrubbing the gaseous mixtures with aqueous alkaline solutions which absorb the acidic gases. Where feasible, the aqueous alkaline absorption solutions are regenerated by stripping processes.

To understand the invention here involved it is necessary to consider the background of scrubbing-stripping processes for carbon dioxide or hydrogen sulfide as they have been known in the past. Although the limits are not sharply defined, there are in general three classes of processes. A high concentration process is one employed to reduce a content of 35% or more of carbon dioxide down to say 2% to 5%. An intermediate concentration process is one employed to reduce the carbon dioxide content to 100 to 1000 p.p.m.; while a low concentration process is one employed to effect still further reductions in the carbon dioxide content down to traces of the gas or substantially zero p.p.m. It will be understood that the same procedure as hereinafter described which is effective in removing carbon dioxide will also be effective in removing hydrogen sulfide or a mixture of the two gases. Consequently for brevity, reference hereinafter will be made to carbon dioxide as the gas to be removed, it being understood that hydrogen sulfide will be included insofar as it is present.

In high concentration processes, regeneration of the absorption solution is feasible, and for the most part the scrubbing process in current use employs a solution of ethanolamine, a solution of potassium carbonate, or plain water. The same thing is largely true of intermediate concentration procedures. Low concentration processes have largely been non-regenerative and have included scrubbing with caustic or aqueous ammonia, the solution being discarded when exhausted.

Chemical type absorbent solutions are favored because of their higher capacity and greater selectivity for the carbon dioxide relative to the other constituents of the gas stream. In treating a gas having a high concentration of carbon dioxide, the energy required per unit of the gas removed becomes the most important factor, the ability to obtain a lower concentration of carbon dioxide being of relatively secondary importance. In prior practices, where the process gas contained initially a large quantity of carbon dioxide, but a lower ultimate concentration than about 1000 p.p.m. was required, it has been the practice to subject the gas to a second and separate treatment or treatments for obtaining the lower concentrations.

As is well known, in the chemical scrubbing of process gases, the gases are brought into contact with a chemical solution capable of absorbing carbon dioxide in an absorption tower. The solution collecting in the bottom of the tower, and now rich in carbon dioxide, is withdrawn and passed through a regenerator or stripping tower where most of the carbon dioxide is stripped from it. Thereupon the regenerated solution can be returned to the absorption tower. In prior art operations temperature levels around 200° to 240° F. are employed, at which levels steam efficiency of as high as 9 to 10 s.c.f. of $CO_2$/lb. of steam are possible under some conditions. It will be understood that steam is used to strip the carbon dioxide from the rich solution in the regenerator. The vaporization of water from the rich solution along with the carbon dioxide constitutes an important limitation on the obtainable steam efficiency, since the energy requirements of the system are increased by the heat carried out by the vaporized water. This action occurs at the point in the system where the pressure on the rich solution is released, usually in the upper part of the regenerator.

Prior art workers have also used flashing processes to reduce the carbon dioxide content of the rich absorption solution. The prior art flashing technique may be described as a continuous equilibrium vaporization. Under these circumstances, the rich absorption solution is passed into a flash chamber at reduced pressure wherein the liquid is partially vaporized, substantially instantaneously, under such conditions that an equilibrium exists between all of the vapor formed and all of the remaining liquid. In this type of flashing, the vapor formed is primarily water (in the form of steam) with some carbon dioxide. The amount of carbon dioxide removable by such a flashing process is limited because water in the form of steam comes off more readily than the carbon dioxide.

Such flashing operations have been used with success in bulk removal operations. In addition, such flashing operations have been combined with conventional stripping processes so as to concentrate the solution to be stripped and thereby reduce the amount of water required to be vaporized by the stripping operation. While the amount of carbon dioxide removable by such flashing processes is limited, the energy requirements of flashing are far less than those of stripping.

The present invention is based on the discovery that carbon dioxide may be removed from the rich absorption solution by flashing of the type which may be referred to as successive flash vaporization. In the practice of the present invention, the advantage of the low energy requirements of flashing may be realized while, at the same time, the carbon dioxide content of the absorption solution may be reduced to levels equal to or better than those hitherto obtainable by stripping. As will be described hereinafter, the present invention contemplates subjecting the rich absorption solution to two continuous equilibrium vaporizations in the same flash chamber. The vapors formed in both continuous equilibrium vaporizations are combined and separated from the residual liquid and the liquid is returned to the absorption or scrubbing tower. The process of the present invention requires less total equipment for its practice, and hence may be practiced with substantially less investment. Overall performance is improved, not only from the standpoint of the removal of carbon dioxide and other acidic gases, but also with respect to corrosion, leakage and plugging. The present invention provides a unitary process and apparatus capable of lowering or reducing a high content of carbon dioxide to a lower level than has hitherto been found possible with low energy requirements.

SUMMARY OF THE INVENTION

The invention relates to a process and apparatus for stripping acidic gases from gaseous mixtures by means of a regenerable aqueous alkaline solution which absorbs the acidic gases. In accordance with the invention, the gaseous mixtures and the solution are brought into intimate contact, at an elevated temperature, in an absorption tower. The rich absorption solution is regenerated by successive flash vaporization.

The rich absorption solution is introduced into a flash chamber at reduced pressure. A first or initial flash occurs, wherein a considerable quantity of water (in the form of steam) is released, together with some carbon dioxide. The remaining liquid pools at the bottom of the flash chamber and a second or slower desorption reaction takes place at the interface of the pooled liquid and the gas. This second or slower flash desorption reaction favors the release of carbon dioxide and is made possible by the fact that heat makeup is provided both for the heat loss in the initial flash and the heat loss of the flash desorption reaction. In addition, the flash chamber is of such capacity as to allow a sufficient residence time of the solution in the chamber to permit the slower flash desorption reaction to proceed to equilibrium. When desired, the flash chamber may be provided with a small scrubbing tower to recover water. The lean solution in the flash chamber is withdrawn therefrom, increased in pressure and returned to the absorber.

Where even lower carbon dioxide values are sought, a portion of the lean solution may be withdrawn from the flash chamber, cooled and added to the top of the absorption tower. When a very low ultimate concentration of carbon dioxide is desired in the purified gas, this cooled solution may be subjected to additional regeneration by the use of an additional, and relatively small, desorption tower.

DESCRIPTION OF THE PREFERRED EMBODIMENTS

In the practice of this invention, the efficiency and energy requirements is improved by reducing the vapor pressure of the water relative to the vapor pressure of the carbon dioxide. It has been found that this can be done effectively by reducing the overall temperature level of the system.

While this may be done with any of the alkaline water solutions in current use for the chemical absorption of carbon dioxide, there is nevertheless considerable importance in the choice of the absorbent chemical. A water solution of potassium carbonate leads to the danger of precipitation of potassium bicarbonate at the reduced temperatures of this invention. The ethanolamines have been found more effective for various reasons, including the ease of reversal of the reaction, high reaction rates in the absorber tower, and the absence of precipitation even in concentrated solutions during high degrees of conversion. In the practice of this invention diethanolamine (DEA) has been found to have more advantageous properties than monoethanolamine (MEA) or triethanolamine (TEA). A high rate of reaction is desirable because it permits the use of smaller equipment for a given purification. Both MEA and DEA rate well in this respect. The vapor pressure of the amine is important because even at the elevated temperatures of the process, the contamination of the gas being treated by amine vapor is to be avoided. In the table which follows it will be seen that both DEA and TEA have a lower vapor pressure than MEA. The heat of the reaction is important. There is a temperature rise in the absorber which tends to limit the solution capacity. DEA is better than MEA in this respect as is also shown by the following table.

TABLE I

| | Aqueous solution | | | |
| --- | --- | --- | --- | --- |
| | MEA | DEA | TEA | $K_2CO_3$ |
| Relative rates of absorption (bubbler ests) | 1.5 | 1.3 | 1.0 | 0. |
| Amine vapor pressure at 200° F., mm. Hg | 35 | 0.4 | 0.013 | 0 |
| Heat of absorption, B.t.u./s.c.f. $CO_2$ | 100 | 55 | | 39 |

Figure 1:
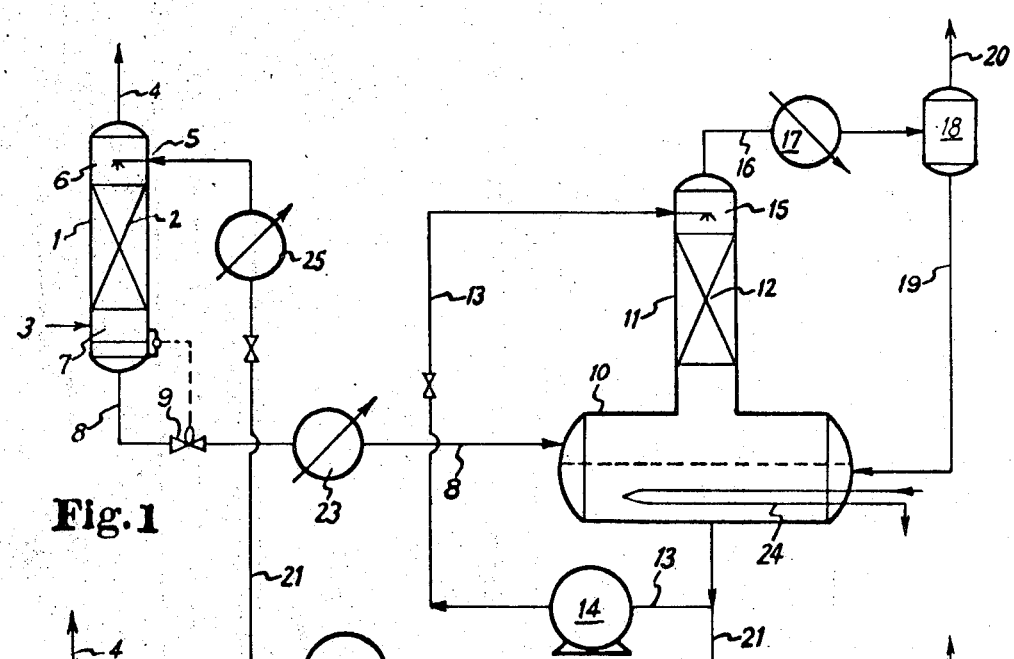
FIG. 1 is a diagrammatic view of an apparatus which may be employed in practicing the general aspects of the invention.

Referring now to FIG. 1, which is diagrammatic in character, the numeral 1 indicates an absorption tower or column. The tower is equipped with means insuring an intimate contact of the gas to be treated with the treating solution. These means are usually bubble trays, Raschig rings or the like as will be readily understood by the skilled worker in the art. The numeral 2 indicates the contacting means which occupies the greater part of the inner length of the tower.

The process gas to be treated enters the tower at 3 and, after being scrubbed, leaves it at 4, being carried to a use or storage system by a suitable conduit. The treating solution enters the upper part of the tower at 5, and is usually sprayed downwardly by spray head or distributor head means diagrammatically indicated at 6.

The scrubbing solution collects in the bottom portion 7 of the absorption tower and is withdrawn through a conduit 8 equipped with control valve means 9. A continuation of the conduit 8 carries the rich solution to an enlarged chamber 10 forming part of a regenerator apparatus. The rich solution initially flashes into the chamber 10, and water vapor or steam together with carbon dioxide and other absorbed gases, released from the solution during this initial flash, pass from the chamber 10 into a small scrubbing column or tower 11 fitted with contacting devices as above described and indicated generally at 12. The remaining solution pools in the bottom of the chamber.

The chamber 10 is made large enough to provide a sufficient residence time for the pooled solution in it, so that a slower flash desorption reaction can take place and proceed essentially to equilibrium. The water vapor or steam and gases released from the liquid during the slow flash desorption reaction in the chamber 10 are combined with the vapors and gases released in the initial flash and scrubbed in the tower portion 11 by withdrawing some of the liquid through a conduit 13 fitted with a pump 14 and returning it to the upper portion of the tower 11, showering it downwardly through one or more spray or distributor heads 15. The liquid so recirculated drains back into the flash chamber 10 as will be evident from the drawing.

The stripped carbon dioxide containing some water vapor is carried from the top of the tower 11 by a conduit 16 through a condenser 17 and a condensate accumulator 18. The water is thus effectively separated from the carbon dioxide and is returned to the flash chamber 10 through a conduit 19 in order to maintain the water balance. The carbon dioxide leaves the accumulator at 20, and may be vented or carried to another system in which it will be used.

The main bulk of the regenerated solution is withdrawn at 21 from the flash chamber 10, increased in pressure by the pump 22 and returned to the top of the absorber tower at 5.

There are various temperature control means which are of value in the practice of the invention. Thus a heater 23 may be included in the conduit 8. The purpose of the heater 23 is to control the temperature of the solution in conduit 8. For example, the heater 23 may be used to raise the temperature of the solution to compensate for the initial, instantaneous physical flash which occurs in the chamber 10, so that the temperature of the solution of the initial flash may be approximately that desired to be maintained in the flash chamber 10. In addition, a steam coil 24 is located in the flash chamber 10. The steam coil 24 is used for heat make up in the system. Thus the steam coil 24 may be used to compensate for the heat loss resulting from the slow flash desorption reaction which takes place in the flash chamber 10. Finally, the conduit 21 by which the regenerated solution is returned to the absorber tower may be equipped with a solution cooler 25, to adjust the temperature of the regenerated solution as it enters the absorber tower, if necessary.

Using a solution of DEA in accordance with this invention, the efficiency of the absorption stripping system can be increased very effectively by operating at lower overall temperature levels. This is illustrated by the data in Table II.

flashing and the efficiency obtained through the use of a tower having at least a packing volume equal to that of the absorber, is substantially the same.

TABLE III

|  | With flash chamber | With conventional reactivator tower |
|---|---|---|
| Percent $CO_2$: |  |  |
| Feed gas | 16–20 | 16–20 |
| Product gas | 0.5 | 0.5 |
| Gas rate, s.c.f.m | 20 | 20 |
| Solution rate, g.p.m | 1.5 | 1.5 |
| Steam efficiency of system | 7.87 | 7.7 |
| Pressure in absorber, p.s.i.g | 300 | 300 |
| Pressure in conventional regenerator, p.s.i.g |  | 5 |
| Pressure in flash chamber, p.s.i.g | 5 |  |
| Residence in flash chamber, minutes | 30 |  |
| Solution, percent DEA | 35 | 35 |

It has already been indicated that the tower 11 which forms a part of the regenerator is small. With a sufficient capacity of the flash chamber 10, the tower may be eliminated entirely. It has a certain usefulness as will be evident; but in the practice of this invention the packing volume of the short tower 11 need not be greater than from about 10% to about 20% of the packing volume of the absorber tower 1. Holding time in the flash chamber can be from 5 to 30 minutes or longer with 10 minutes being preferred. The solution recirculated to the top of the regenerator column can be on the order of 0.1 to 1.0 times the flow of solution to the absorber with .2 to .3 times being preferred. If the tower 11 is provided with bubble trays, as described above, the residence time of the solution therein will be increased. In this instance the size of the chamber 10 may be decreased since the residence time in the tower 11 is increased.

Figure 3:
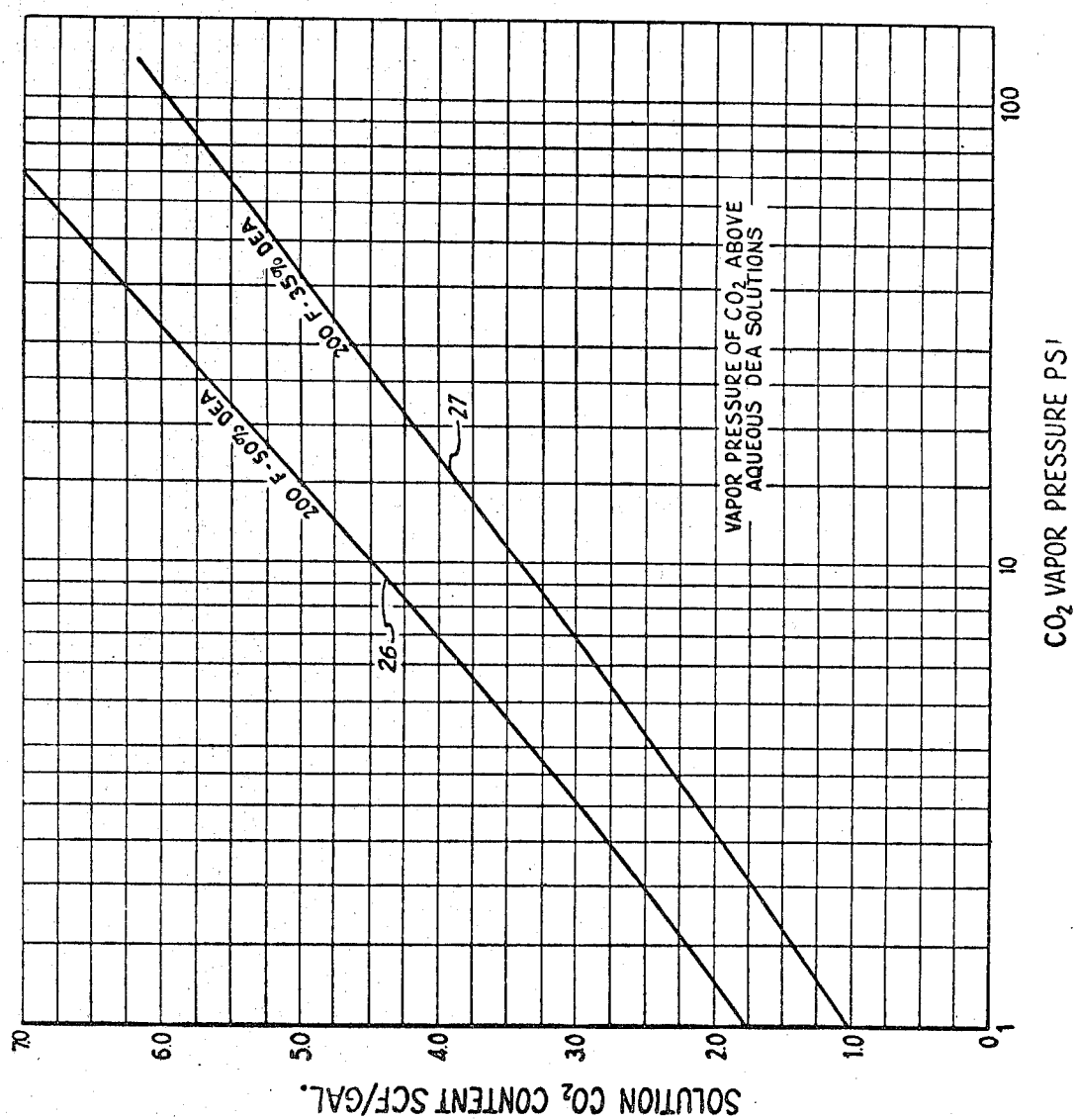
FIG. 3 is a chart in which the carbon dioxide vapor pressure in pounds per square inch is plotted against the solution content of carbon dioxide.

Yet another advantage of the process of this invention is that it permits the use of higher amine concentrations in the scavenging solution. Thus somewhat higher temperature levels for higher reaction rates in the absorber may be used while maintaining the advantage of lower water vapor pressures. Also, the use of more concentrated amine solutions will result in a saving in pump power and capacity because a slower rate of solution circulation can be employed. This is illustrated in FIG. 3, where it will be noted that the slope of the curve 26 for a 50% DEA solution is appreciably greater than that of the curve 27 for 35% DEA solution, where the carbon dioxide content of the rich solution is plotted against carbon dioxide vapor pressure. Thus for a given partial pressure of carbon dioxide in the feed gas, the 50% solution will have a higher carbon dioxide absorption capacity. In general, in the practice of the invention, concentrations of substantially 35% to 50% DEA are preferred.

From the above it will be evident that the present in-

TABLE II.—SCRUBBING WITH 40% DEA SOLUTION

| Percent $CO_2$: |  |  |  |  |  |  |
|---|---|---|---|---|---|---|
| Feed gas | 33 | 33 | 33 | 33 | 33 | 33 |
| Product gas | 2 | 2 | 2 | 2 | 2 | 2 |
| Solution circulation, g.p.m | 1,265 | 1,265 | 2,200 | 2,660 | 1,810 | 2,110 |
| $CO_2$ concentration: |  |  |  |  |  |  |
| Rich | 6 | 7 | 7 | 7 | 8 | 8 |
| Lean | 2 | 3 | 4.7 | 5.1 | 5.2 | 5.6 |
| Absorber solution temperature: |  |  |  |  |  |  |
| Top | 206.5 | 202 | 200 | 190 | 190 | 180 |
| Bottom | 242 | 237 | 220 | 207 | 214 | 201 |
| Flash chamber solution, temperature | 217 | 217 | 200 | 190 | 190 | 180 |
| Steam efficiency, s.c.f. $CO_2$/lb. steam | 9 | 11 | 16 | 26 | 27 | 59 |

Whereas in prior art work with chemical absorption processes it has been necessary to provide relatively large stripping columns (usually large enough to have from 1 to 1.5 times the packing volume of the absorber), this is no longer necessary in the practice of the invention, where DEA is used and where a sufficient holding time for the liquid is provided in the flash chamber 10. The experimental data in Table III below, which was obtained from a large scale pilot plant operated alternatively with a conventional reactivator column or stripper and with the flash chamber of this invention, indicates that the efficiency obtained where the desorption occurs primarily by vention contemplates a system which operates at a lower temperature (on the order of from about 180° F. to about 200° F.) and which includes a flash chamber of such capacity as to provide a residence time sufficient to permit the decidedly slower flash desorption reaction to proceed to equilibrium. Compensatory heat is provided not only for the loss due to the initial instantaneous flash (which is to a large extent primarily water vapor), but also for the loss caused by the slower flashing of carbon dioxide during the flash desorption reaction. As shown in Table III, the process and apparatus of the present invention can produce results at least comparable to those achieved by conventional stripping. In Table II, it is shown that steam efficiencies can be achieved which were hitherto unobtainable by prior art processes and apparatus.

The foregoing teachings relate essentially to the basic process of this invention for the removal of carbon dioxide by chemical absorption with a minimum expenditure of steam. The result of the practice of the process as described will be to reduce the carbon dioxide content of the process gases to a value within the intermediate range as set forth above. In the past, where a very low ultimate carbon dioxide content is desirable or necessary, the initial purification has been supplemented by a second scrubbing procedure in an entirely separate system. In the practice of the present invention, however, it is quite possible to combine the effects of two separate scrubbing operations into one, thus requiring far less than the usual equipment. The carrying down of the carbon dioxide content to a very low value is best accomplished by combining hot and cold scrubbing.

Figure 2:
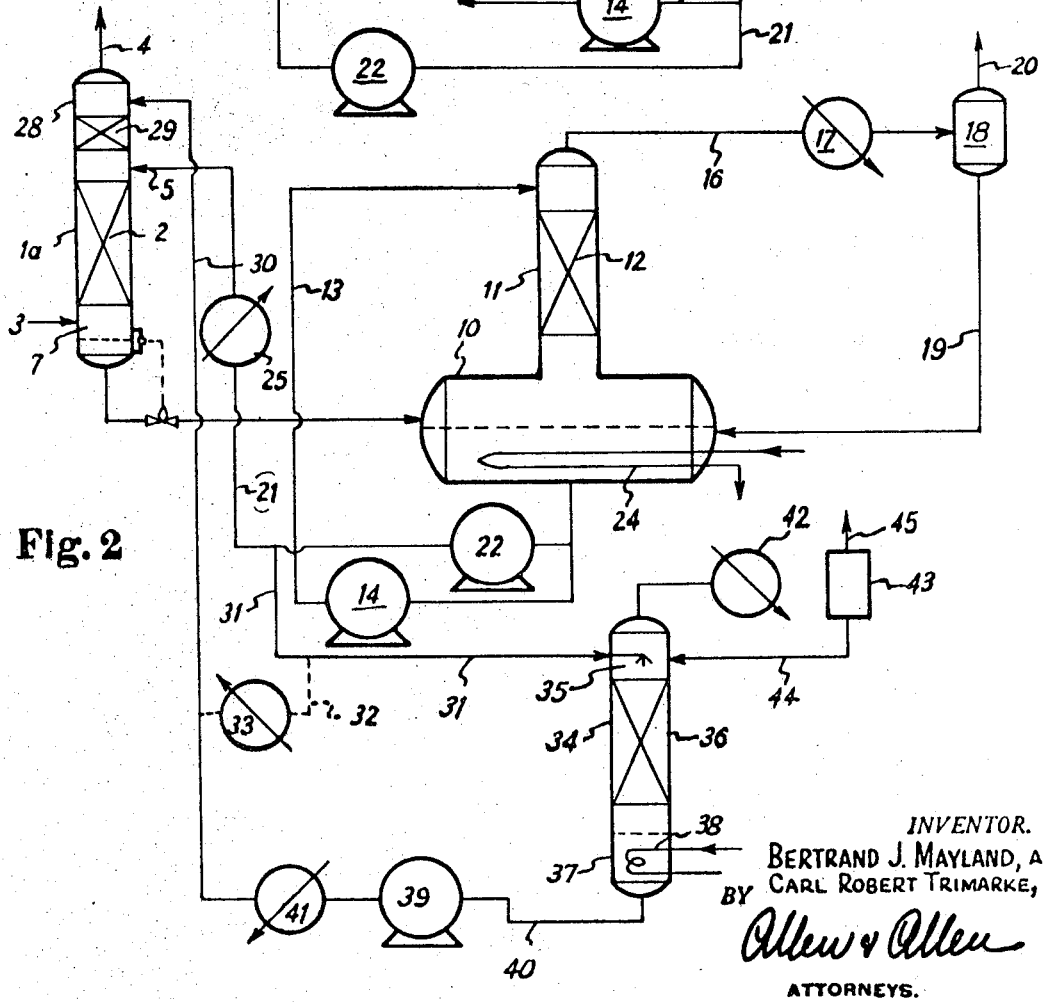
FIG. 2 is a diagrammatic representation of apparatus which may be employed in practicing a modified process for the purpose of removing additional quantities of carbon dioxide in the same operation.

An arrangement of equipment for accomplishing this is illustrated in FIG. 2, where like parts have been given like index numerals. These parts will function as hereinabove described. It will be noted that the absorber tower 1a, containing the packing or contacting means 2, is made somewhat taller so as to provide an upper section 28 having packing or contacting means 29. The process gas entering the apparatus at 3 again passes upwardly through the absorption tower to exit in purified condition at 4. In doing so, it has its bulk carbon dioxide content removed in the tower section containing the packing 2, while the rich solution is withdrawn from the bottom of the tower and flashed into the chamber 10. There is preferably the same short tower 11 with provisions 13 and 14 for the recirculation of the regenerated solution. Also, the regenerated solution is returned by the pump 22 and conduit 21 to the point 5 on the absorption tower.

The upper part 28 of the absorption tower is fed with an amine solution at a substantially lower temperature through a conduit 30. The cooler solution may simply be derived by diverting a portion of the regenerated solution through conduits 31 and 32 (the latter of which is shown in dotted lines) and lowering the temperature of the diverted portion by means of a cooler 33 before it reaches the conduit 30.

Where a very low ultimate concentration of carbon dioxide is desired in the purified gas, the cooler amine solution may be subjected to additional regeneration by the use of an additional and relatively small desorption tower 34. Into this tower the diverted portion of the solution is fed by the conduit 31 to a spray head or heads 35 in the upper portion. A packing or contact means is indicated in the tower 34 at 36. The additionally regenerated solution will collect in the lower portion 37 of the tower where there may be heat control means such as a steam coil 38. From the bottom of the tower 34 the solution is drawn by a pump 39 through a conduit 40 and delivered through a solution cooler 41 to the conduit 30. The tower 34 will be equipped with a condenser 42 and accumulator 43, the accumulated water being returned to tower 34 through conduit 44, and the additional carbon dioxide stripped in the tower 34 will exit from the accumulator at 45.

Typical operating conditions in the process and apparatus shown in FIG. 2 may be thus set forth in Table IV below.

TABLE IV.—SCRUBBING WITH 40% DEA COMBINATION PROCESS

Percent $CO_2$:
  Feed gas—33
  Product gas—0.1
Solution circulation—2600 g.p.m.
$CO_2$ concentration:
  Rich—7.0
  Lean—5.1

Absorber temperature:
  Top—100° F.
  Middle—190° F.
  Bottom—207° F.
Flash chamber, bottom—190° F.
Steam efficiency—26 s.c.f. $CO_2$/lb. steam In the combine procedures here under discussion, a reduction of the carbon dioxide content to less than about 1%, effected by merely cooling a portion of the solution, is readily possible without sacrifice of process efficiency. Such an ultimate value of carbon dioxide content in the gases under treatment is entirely satisfactory for many applications. The additional scrubbing of a diverted part of the regenerated solution, as has been described in connection with the small tower 34, permits the reduction of the carbon dioxide content to a value of less than 100 p.p.m. There is a detectable loss in steam efficiency when this is done; but the overall efficiency is much greater and the apparatus requirements are much less than they would be if two separate stripping systems were employed.

Modifications may be made in the invention without departing from the spirit of it.

The embodiments of the invention in which an exclusive property or privilege is claimed are defined as follows:

1. In a process of stripping acidic gases inclusive of carbon dioxide and hydrogen sulfide from gaseous mixtures by means of a regenerable aqueous alkaline solution which absorbs the acidic gases, the steps of bringing about intimate contact between said gaseous mixtures and said solution at superatmospheric pressure in an absorber wherein said solution and said gaseous mixtures are both at an elevated temperature, withdrawing said solution from the said absorber after it has absorbed the said acidic gases, introducing said solution into a flash chamber at reduced pressure and subjecting it to successive flash vaporization comprising an initial instantaneous flash and a flash desorption reaction, maintaining said solution in said flash chamber for a residence time sufficient to permit said flash desorption reaction to proceed to equilibrium, adding heat to said solution to compensate for cooling resulting from said initial instantaneous flash and said flash desorption reaction and thereafter withdrawing said solution from said flash chamber, increasing its pressure and returning it to the said absorber.

2. The process claimed in claim 1 wherein the capacity of the said flash chamber in proportion to the flow of said solution from said absorber is such as to permit a residence time therein of said solution of at least about 5 to about 30 minutes.

3. The process claimed in claim 1 wherein said solution is heated after removal from said absorber and before being introduced into said flash chamber to compensate for cooling resulting from said initial instantaneous flash, and wherein said solution is heated in said flash chamber to compensate for cooling resulting from said flash desorption reaction.

4. The process claimed in claim 1 wherein said solution is cooled after leaving said flash chamber and before re-introduction into said absorber.

5. The process claimed in claim 1 wherein said solution is a water solution containing from about 35% to about 50% diethanolamine.

6. The process claimed in claim 1 wherein a portion of the solution from said flash chamber is diverted and cooled to a temperature below that of the remaining portion and is introduced into said absorber and brought into intimate contact with said gaseous mixtures separately from and following the treatment of said gaseous mixtures with the main portion of said regenerated solution.

7. The process claimed in claim 3 wherein the said acidic gases and water vapor from said solution in said flash chamber leave said flash chamber and pass through a short tower wherein they are brought into intimate contact with a recirculated portion of said solution from said flash chamber.

8. The process claimed in claim 4 wherein the temperature of said solution as introduced into said absorber is from about 180° F. to about 206° F.

9. The process claimed in claim 6 wherein the temperature of said main portion of the regenerated solution reintroduced into the absorber is from about 180° F. to about 206° F., and wherein said diverted portion of the regenerated solution is cooled to a temperature of about 100° F. before reintroduction into the absorber.

10. The process claimed in claim 7 wherein the said short tower has from about 10% to about 20% of the packing volume of said absorber and wherein the volume of solution recirculated to said short tower is from about 0.1 to about 1.0 times the flow of solution to said absorber.

11. The process claimed in claim 7 wherein said acidic gases issuing from said tower are treated for the separation of water vapor therefrom, and wherein the water from said water vapor is condensed and returned to said flash chamber.

12. The process claimed in claim 9 wherein said diverted portion of the regenerated solution is further subjected to an additional regeneration step in a desorption tower.

13. The process claimed in claim 11 wherein said solution is a water solution containing from about 35% to about 50% diethanolamine.

References Cited
UNITED STATES PATENTS

| | | | |
|---|---|---|---|
| 1,986,228 | 1/1935 | Seguy | 23—3 |
| 2,164,194 | 6/1939 | Millar et al. | 23—2 |
| 2,477,314 | 7/1949 | Scharmann | 23—2 |
| 2,860,030 | 11/1958 | Goldtrap et al. | 23—3 |
| 2,886,405 | 5/1959 | Benson et al. | 23—3 |

EARL C. THOMAS, Primary Examiner